428-408 SR

8/26/86 OR 4,608,308

United States Patent [19]

Igarashi et al.

[11] Patent Number: 4,608,308

[45] Date of Patent: Aug. 26, 1986

[54] DISPERSIVE TYPE ELECTROLUMINESCENT DEVICE AND METHOD FOR MANUFACTURING SAME

[75] Inventors: Masami Igarashi; Yoshinori Kato; Yoshimi Kamijo, all of Furukawa, Japan

[73] Assignee: Alps Electric Co., Ltd., Japan

[21] Appl. No.: 605,596

[22] Filed: Apr. 30, 1984

[30] Foreign Application Priority Data

Apr. 28, 1983 [JP] Japan .................................. 58-73722

[51] Int. Cl.[4] ........................ H05B 33/12; B32B 17/06

[52] U.S. Cl. ....................................... 428/408; 427/66; 428/469; 428/690; 428/917; 313/503; 313/505; 313/506

[58] Field of Search ............... 428/408, 469, 691, 690, 428/701; 313/503, 505, 506

[56] References Cited

U.S. PATENT DOCUMENTS

| | | | |
|---|---|---|---|
| 3,009,834 | 11/1961 | Hanlet | 428/408 X |
| 3,054,919 | 9/1962 | Lehmann | 428/690 |
| 3,172,862 | 3/1965 | Gurnee et al. | 313/503 |
| 3,315,111 | 4/1967 | Jaffe et al. | 313/503 |
| 4,095,011 | 6/1978 | Hawrylo et al. | 428/690 X |
| 4,112,328 | 9/1978 | Wolfe et al. | 428/691 X |
| 4,326,007 | 4/1982 | Williams et al. | 428/691 X |
| 4,416,933 | 11/1983 | Antson et al. | 428/701 X |
| 4,418,118 | 11/1983 | Lindors | 428/701 X |

*Primary Examiner*—George F. Lesmes
*Assistant Examiner*—Nancy A. B. Swisher
*Attorney, Agent, or Firm*—Guy W. Shoup

[57] ABSTRACT

A dispersive electroluminescence comprising a fluorescent layer coated on a transparent electrode, and an opposing electrode comprising a conductive layer in contact with the fluorescent layer and a low resistance external layer. The conductive layer is mainly composed of conductive fine particles, and majority of such conductive fine particles are three-dimensionally in contact with each other forming a conductive path and fill in the spaces in the surface of the fluorescent layer. The conductive layer is formed on the fluorescent layer by spraying a liquid composed of fine conductive particles dispersed in an organic liquid on the fluorescent layer and then drying it.

6 Claims, 4 Drawing Figures

DISPERSIVE TYPE ELECTROLUMINESCENT DEVICE AND METHOD FOR MANUFACTURING SAME

FIELD OF THE INVENTION

The present invention relates to an electroluminescence (hereinafter referred to as EL) and more specifically to its constituent layers and opposing electrodes and manufacturing thereof.

BACKGROUND OF THE INVENTION

A fluorescent layer obtained by adding a small amount of activator such as Mn or Cu to ZnS or ZnSe is provided between a transparent electrode and opposing electrode and a specified voltage is applied across both electrodes. Thereby, said fluorescent layer emits light. A flat light emitting panel utilizing such fluorescence phenomenon is called EL panel.

Such EL panel can be classified into a dispersive type and thin film type in accordance with a method for forming the fluorescent layer or into a DC type and AC type in accordance with a driving method.

Said dispersive type fluorescent layer can be formed by obtaining a paste through dispersion of fine particle powder adding a small amount of Mn or Cu to ZnS or ZnSe into the solution of organic binder, and then coating it onto transparent electrodes by screen printing or with a doctor knife. Meanwhile, a thin film type fluorescent layer can be formed utilizing a thin film forming technology such as vacuum-deposition or sputtering method etc. Said DC type uses a DC power supply as a driving source, while AC type utilizes a AC power supply as a driving source. The present invention is directed to dispersive EL.

FIG. 1 shows a sectional view of a conventional dispersive EL panel. A transparent electrode 2 is formed on a transparent substrate 1 such as a glass plate and a fluorescent layer 3 is coated on such transparent electrode 2. An opposing electrode 4 is composed of a metal thin film formed by vacuum deposition or sputtering of aluminum and it is opposed to the transparent electrode 2 through the fluorescent layer 3.

When a DC voltage is applied across the transparent electrode 2 and the opposing electrode 4, a heavy current flows in the initial stage but light is not emitted. As the voltage is gradually increased, the current decreases on the contrary and light is emitted at a certain voltage. This process is called forming and when forming once occurs, the light is emitted in a peculiar color with a minute current.

However, this dispersive EL has following disadvantages. FIG. 2 shows an enlarged sectional view of the junction area of the fluorescent layer 3 and opposing electrode 4 of such dispersive EL. The opposing electrode 4 is often not in even contact with the surface of fluorescent layer 3. As described above, the fluorescent powder paste is coated and dried up, in the dispersive EL, in order to form the fluorescent layer 3. Therefore, the surface is considerably uneven because of bubbles in the fluoresent powder paste or roughness of particles due to aggregation of fluorescent powder 5. On the other hand, the opposing electrode 4 is composed of a metal thin film formed by vacuum-deposition etc. and therefore it is inferior in flexibility and close-contactness and clearances 6 are generated to and fro between the fluorescent layer 3 and opposing electrode 4. When such clearances 6 exist, the contact area between the fluorescent layer 3 and opposing electrode 4 becomes small and a resistance value between the transparent electrode 2 and opposing electrode 4 becomes large. As a result, a forming end voltage becomes high and a drive voltage is inevitably increased. Moreover, as described above, if such clearances 6 exist as described above, additional disadvantages are generated, namely the corresponding area does not emit the light and brightness is as much lowered.

In order to improve close contact between the fluorescent layer and opposing electrode, it has been proposed that a conductive resin bonding layer obtained by additionally mixing conductive fine particles such as carbon to the resin in a hot melt be provided between said fluorescent layer and opposing electrode. Here, said conductive resin adhesive contains a large amount of a thermosetting resin (binder component) in the adhesive layer in order to increase adhesivity. The conductive fine particles are mainly chained in order to result in conductivity and the spaces between such chaining structure are filled with resin. Therefore, even a conductive resin adhesive layer has an electric resistance value as high as several hundred ohms to several thousand ohms. If the conductive layer's resistance is high as described above the forming step does not proceed uniformly and the forming speed is different at the edge portion of the light emitting surface and the central area. Such difference readily causes flucturation in light emission, uniform light emission cannot be obtained in a wider area and a high driving voltage is required.

In addition, a conductive resin adhesive layer is attached to the fluorescent layer after said adhesive layer is softened and melted by heating. In such a case, viscosity is high and therefore it is difficult to enter the fine clearance at the surface of the fluorescent layer, resulting in fluctuation of light emission.

SUMMARY OF THE INVENTION

It is an object of the present invention to provide a dispersive EL and a method of manufacturing the same which solves the disadvantages of such prior art and, assures uniform light emitting phenomenon without fluctuation of light emission and uses a low driving voltage.

In order to attain this object, the present invention is characterized in that an opposing electrode is composed of a laminated structure of the conductive layer arranged in the side of fluorescent layer and a low resistance layer arranged in contact with the external surface, said conductive layer is mainly composed of conductive fine particles and a majority of such conductive fine particles are in contact three dimensionally with each other forming a conductive path and fills any fine clearances at the surface of fluorescent layer, and therefore a method of forming such conductive layer is characterized in that fine particles such as graphite are uniformly dispersed and suspended in an organic liquid such as alcohol, or a liquid having a low viscosity such as water, or preferably in a liquid having a good penetration characteristic to the fluorescent layer, the dispersed liquid is coated onto the surface of the fluorescent layer by spraying or an appropriate means such as dipping and then it is dried up.

In the abovementioned method, it is also possible that the layer of conductive fine particles is processed by a dispersion reinforcing agent such as a coupling agent or surface active agent or a little amount of dispersion agent is added into the dispersion liquid in order to enhance the dispersing condition of conductive fine particles in the dispersion liquid. It should be particularly noted on the occasion of using aforementioned dispersion reinforcing agent or adding dispersion agent that the viscosity of the dispersion liquid is not raised by such agents and moreover the resistance of the conductive layer formed is kept low.

DETAILED DESCRIPTION OF THE INVENTION

The present invention will then be explained below in detail by referring to the attached drawings.

Figure 1:
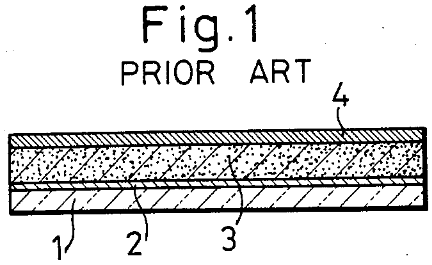
Fig.1 PRIOR ART
FIG. 1 is a sectional view of a part of conventional electroluminescence.
Figure 2:
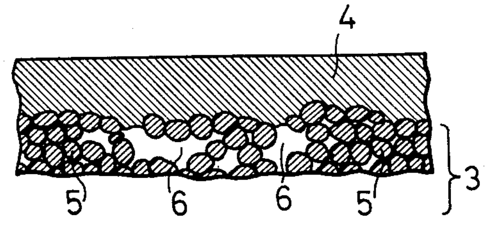
Fig.2 PRIOR ART
FIG. 2 is an enlarged view of a part of such electroluminescence.
Figure 3:
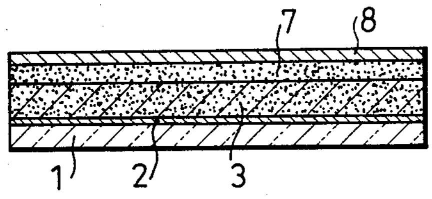
FIG. 3 and FIG. 4 is a sectional view of a part of electroluminescence shown as an embodiment of the present invention.

FIG. 3 is a sectional view of a part of an EL panel indicating the first embodiment of the present invention. On a transparent substrate 1 such as a glass plate, a transparent electrode 2 is formed by the known method and further a fluorescent layer 3 is formed thereon. As the fluorescent fine powder which is the main component of the fluorescent layer 3, fine powder (particle size of about 0.5 to 10 um) of zinc sulfide containing Mn of 0.1 to 1.0 weight % and Cu of 0.01 to 0.1 weight % is coated by the copper (in weight % of about 0.1 to 0.8 for the zinc sulfide). As an organic binder, a compound of cellulose such as ethylcellulose or nitrocellulose is used, while as a solvent, tarpineol or butylcarbithol is used. An organic binder to about 1 to 20 weight% and a solvent of about 50 to 200 weight% are kneaded to said fluorescent material powder and a paste can be obtained. The fluorescent layer 3 is formed in the thickness of about 5 50 um by coating said paste on the transparent electrode 3 by screen printing or using a doctor knife.

A conductive layer 7 is formed on such fluorescent layer 3. This conductive layer 7 is formed by coating a liquid obtained by dispersing fine particles such as graphite into alcohol or organic liquid such as benzene or toluene by the spray method and then it is dried up. Said liquid also penetrates into any fine clearance or crack formed on the fluorescent layer 3 and therefore a conductive layer 7 is formed on the fluorescent layer 3 perfectly filling the uneven surface thereof. Moreover when the coated liquid is dried up, the dispersed medium is volatilized. Accordingly, fine particles of graphite are aggregated with each other and the majority of them is three dimensionally in contact each other. Since this conductive layer 7 does not contain an organic binder, different from that proposed conventionally, a sheet resistance value is very low as about 5 to 50 ohms. In addition, the graphite forming a conductive layer 7 is composed of fine particles and therefore the conductive layer 7 has good surface flatness and close-contactness with a vacuum-deposited film 8 described later.

A vacuum-deposited film 8 of aluminium having a low resistance value is closely formed on this conductive layer 7 and the opposing electrode having the laminated structure is formed by such conductive layer 7 and vacuum-deposited film 8.

Brightness in light emission of the EL of the present invention thus obtained and the conventional EL is compared in the following table.

| | Measuring voltage | | |
|---|---|---|---|
| | DC 50 V | DC 70 V | 50 Hz AC 30 V |
| EL of embodiment | 48 cd/m$^2$ | 97 cd/m$^2$ | 55 cd/m$^2$ |
| Conventional EL | 7 cd/m$^2$ | 58 cd/m$^2$ | 12 cd/m$^2$ |

As is understood from this table, an EL of an embodiment of the present invention assures effective emission of light even with AC driving as well as DC driving.

Figure 4:
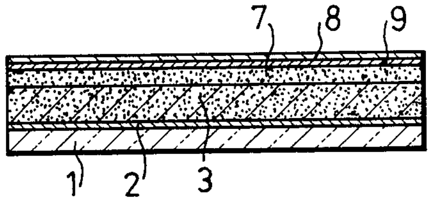

FIG. 4 shows a cross-sectional view of another EL panel for explaining the second embodiment of the present invention. This embodiment is different from said first embodiment in that a conductive adhesive agent layer 9 is provided between the conductive layer 7 and vacuum-deposited film 8. This conductive adhesive agent layer 9 is previously formed in on vacuum-deposited film 8 and which is then pressurizingly bonded to the conductive layer 7 by said adhesive agent layer 9. Therefore, the opposing electrode has a three-layer structure consisting of the conductive layer 7, vacuum-deposited film 8 and conductive adhesive agent layer 9.

An El of the second embodiment also has excellent brightness of light emission as in the case of the first embodiment.

The present invention has a structure as explained above and assures good close-contactness between the fluorescent layer and opposing electrode with low electrical resistance of said opposing electrode, and thereby results in uniform light emission and realizes low voltage driving. Moreover, according to aforementioned method, the conductive layer can be formed to readily fill in any spaces in the surface of the fluorescent layer and a high quality dispersive EL can be mass-produced.

What is claimed is:

1. A dispersive type electroluminescent device comprising a fluorescent layer coated on a transparent electrode and an opposing electrode provided opposed to said transparent electrode with said fluorescent layer interposed therebetween, wherein said opposing electrode is composed of a laminated structure comprising a conductive layer formed on said fluorescent layer and a low resistance layer formed on said conductive layer, where said conductive layer is mainly composed of conductive fine particles, and a majority of said conductive fine particles are three-dimensionally in contact with each other forming a conductive path and enter the fine clearance at the surface of said fluorescent layer; and said conductive layer does not contain a synthetic resin binder.

2. A dispersive type electroluminescent device according to claim (1), wherein said conductive layer is formed by being coated directly on the surface of said fluorescent layer.

3. A dispersive type electroluminescent device according to claim (1), wherein conductive fine particles forming said conductive layer is graphite.

4. A dispersive type elctroluminescent device according to claim (1), wherein said low resistance layer is formed with a metallic vacuum-deposited film.

5. A dispersive type electroluminescent device according to claim (1), wherein said resistance layer is composed of metal foil having a conductive adhesive agent on one side and said resistance layer is attached to said conductive layer by means of said adhesive agent.

6. A method of forming a dispersive type electroluminescent device comprising:

forming a transparent electrode on a transparent substrate;

forming a fluorescent layer on said transparent electrode; and forming a conductive layer by depositing a liquid containing a dispersion of conductive fine particles in an organic liquid without any synthetic resin binder onto said fluorescent layer and drying up said liquid so that only said conductive fine particles are left to enter fine clearances in the surface of said fluorescent layer.

* * * * *